United States Patent
Wang et al.

(10) Patent No.: US 10,775,932 B2
(45) Date of Patent: Sep. 15, 2020

(54) METHOD, MOBILE TERMINAL AND NON-TRANSITORY COMPUTER-READABLE STORAGE MEDIUM FOR RESPONSE CONTROL OF TOUCH SCREEN

(71) Applicant: GUANGDONG OPPO MOBILE TELECOMMUNICATIONS CORP., LTD., Dongguan, Guangdong (CN)

(72) Inventors: Hao Wang, Duangdong (CN); Qiang Zhang, Guangdong (CN); Tong Han, Guangdong (CN); Rendong Shi, Guangdong (CN); Mingqiang Guo, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 43 days.

(21) Appl. No.: 16/042,223

(22) Filed: Jul. 23, 2018

(65) Prior Publication Data
US 2019/0034030 A1    Jan. 31, 2019

(30) Foreign Application Priority Data
Jul. 26, 2017    (CN) .......................... 2017 1 0620122

(51) Int. Cl.
*G06F 3/041*    (2006.01)
*G06F 3/0488*    (2013.01)
*G06F 3/0484*    (2013.01)

(52) U.S. Cl.
CPC .......... *G06F 3/04186* (2019.05); *G06F 3/041* (2013.01); *G06F 3/0412* (2013.01);
(Continued)

(58) Field of Classification Search
CPC ......... G06F 3/041–0412; G06F 3/0416; G06F 3/04166; G06F 3/041661; G06F 3/041662;
(Continued)

(56) References Cited

U.S. PATENT DOCUMENTS

2012/0268378 A1* 10/2012 Tokutake .............. G06F 3/0416
                                                              345/168
2013/0100037 A1*  4/2013 Mabie ................... G06F 3/0418
                                                              345/173
(Continued)

FOREIGN PATENT DOCUMENTS

CN    102541382 A    10/2007
CN    103186334 A     7/2013
(Continued)

OTHER PUBLICATIONS

CN102541382 A _ English Abstract.
(Continued)

*Primary Examiner* — David Tung
(74) *Attorney, Agent, or Firm* — Ladas & Parry LLP

(57) ABSTRACT

A method for response control of a touch screen is disclosed. Whether there is a crack on the touch screen is determined. A crack area where the crack is located in the touch screen is determined. The crack area includes a plurality of touch points, each touch point having a response sensitivity to a touch event of the touch screen. A response strategy of the crack area to the touch event of the touch screen is adjusted. A mobile terminal and a non-transitory computer-readable storage medium are also disclosed.

11 Claims, 6 Drawing Sheets

(52) U.S. Cl.
CPC .......... *G06F 3/0416* (2013.01); *G06F 3/0418* (2013.01); *G06F 3/0488* (2013.01)

(58) Field of Classification Search
CPC ............... G06F 3/0418; G06F 3/04182; G06F 3/04184; G06F 3/04186; G06F 3/0488–04886; G06F 3/04847
See application file for complete search history.

(56) References Cited

U.S. PATENT DOCUMENTS

| | | | |
|---|---|---|---|
| 2014/0253494 A1* | 9/2014 | Jiang | G06F 3/0418 345/174 |
| 2014/0320437 A1* | 10/2014 | Kang | G09G 5/373 345/173 |
| 2015/0193074 A1* | 7/2015 | Cudak | G06F 3/0418 345/173 |
| 2017/0045915 A1 | 2/2017 | Pope et al. | |
| 2017/0256051 A1* | 9/2017 | Dwivedi | G06F 3/0346 |
| 2018/0011588 A1 | 1/2018 | Lu et al. | |

FOREIGN PATENT DOCUMENTS

| | | |
|---|---|---|
| CN | 104770009 A | 7/2015 |
| CN | 105630643 A | 6/2016 |
| CN | 106228548 A | 11/2016 |
| CN | 106201066 A | 12/2016 |
| CN | 107422915 A | 12/2017 |

OTHER PUBLICATIONS

CN106228548 A _ English Abstract.
European Search Report in European application No. 18185123.9, dated Dec. 14, 2018.
International Search Report in international application No. PCT/CN2018/095171, dated Sep. 18, 2018.
English Translation of the Written Opinion of the International Search Authority in international application No. PCT/CN2018/095171, dated Sep. 18, 2018.
Non-Final Office Action of the U.S. Appl. No. 16/572,427, dated Jun. 29, 2020.

* cited by examiner

METHOD, MOBILE TERMINAL AND NON-TRANSITORY COMPUTER-READABLE STORAGE MEDIUM FOR RESPONSE CONTROL OF TOUCH SCREEN

CROSS REFERENCE TO RELATED APPLICATIONS

This application claims priority to Chinese patent application No. 201710620122.4 titled "METHOD, DEVICE, STORAGE MEDIUM AND TERMINAL FOR RESPONSE CONTROL OF TOUCH SCREEN", and filed on Jul. 26, 2017, the disclosure for which is hereby incorporated herein in its entirety by reference.

TECHNICAL FIELD

The present disclosure relates generally to the field of touch control technology, and more particularly, to a method, a mobile terminal, and a non-transitory computer-readable for response control of a touch screen.

BACKGROUND

With the popularization of portable devices with touch-sensitive displays, for example, mobile terminals, such as smart phones, and tablet computers, the requirement on the quality of touch screens of such portable devices is becoming higher and higher. The quality of the touch screen affects the interactive experience between the user and the device.

In the daily use of the mobile terminal, the touch screen of the mobile terminal may be easily damaged due to various accidents. For example, the touch screen of the mobile terminal may be cracked, after the mobile terminal fails or is attacked. Due to high replacement and maintenance costs of the touch screen, more and more users choose to continue using the mobile terminal with the damaged touch screen.

The damaged touch screen will affect the normal use of the mobile terminal, and affect the user experience, so there is an urgent need for an optimized solution for the damaged touch screen.

SUMMARY

The present disclosure provides a method, a mobile terminal, and a non-transitory computer-readable storage medium for response control of a touch screen, which can optimize touch control even if the touch screen is cracked.

According to one aspect of the present disclosure, a method for response control of a touch screen is provided, including: determining whether there is a crack on the touch screen; determining a crack area where the crack is located in the touch screen, the crack area comprising a plurality of touch points, each touch point having a response sensitivity to a touch event of the touch screen; and adjusting a response strategy of the crack area to the touch event of the touch screen.

According to an additional aspect of the disclosure, a mobile terminal for response control of a touch screen is also provided. The mobile terminal may include: a processor; a touch screen; and a memory including instructions operable to be executed by the processor to cause the processor to: determine whether there is a crack on the touch screen; determine a crack area where the crack is located in the touch screen, the crack area comprising a plurality of touch points, each touch point having a response sensitivity to a touch event of the touch screen; and adjust a response strategy of the crack area to the touch event of the touch screen.

According to a further aspect of the disclosure, a non-transitory computer-readable storage medium for storing computer executable instructions is provided, the computer executable instructions being used to control a processor to execute a method for response control of a touch screen, the method including: determining whether there is a crack on the touch screen; determining a crack area where the crack is located in the touch screen, the crack area comprising a plurality of touch points, each touch point having a response sensitivity to a touch event of the touch screen; and adjusting a response strategy of the crack area to the touch event of the touch screen.

DETAILED DESCRIPTION OF THE PREFERRED EMBODIMENT

The present disclosure will be herein further described in detail in conjunction with accompanying drawings and the embodiments. It is understood that the embodiments described herein are intended to illustrate the present disclosure, but not to limit the present disclosure. Furthermore, it should be noted that, to facilitate the illustration, merely relevant parts and not all parts of the present disclosure are shown in the accompanying drawings.

Terminology used herein is for the purpose of describing particular embodiments only and is not intended to be limiting of the disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/". Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

The device described herein may include a mobile device or mobile terminal, such as smart phone (for example, Android mobile phone, iOS mobile phone, Windows mobile phone), tablet computer, personal digital assistant (PDA), laptop, mobile Internet device (MID) or wearable device. The above devices are provided for exemplary purposes and should not be interpreted to limit the scope of the device described herein.

Taking a mobile terminal as an example, implementations of the present disclosure will be described in detail. The mobile terminal may include a processor, for example, a central processing unit (CPU), and a touch screen. The processor is configured to control a scanning frequency of the touch screen.

Figure 1:
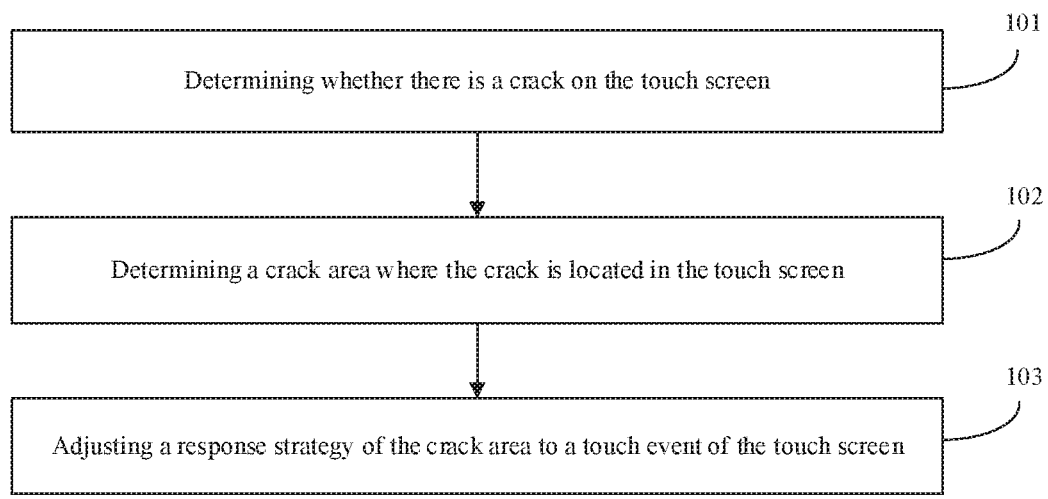
FIG. 1 is a flow diagram illustrating a method for response control of a touch screen according to one embodiment of the present disclosure.

FIG. 1 is a flow diagram illustrating a method for response control of a touch screen according to one embodiment of the present disclosure. The touch screen may be included in a mobile terminal. The method may be performed by a device for controlling the response of the touch screen, and the device may be implemented by software and/or hardware, or integrated into a mobile terminal.

As illustrated in FIG. 1, at block 101, whether there is a crack on the touch screen may be determined. The way of determining the crack on the touch screen is not limited herein. Exemplarily, the user's active feedback may be used to determine whether there is a crack on the touch screen. For example, a touch screen status option may be added. When the user observes that there is a crack on the touch screen, the "existence of a crack" on the touch screen status option is checked. When it is detected that the item is checked, it can be determined that there is a crack on the touch screen. For another example, it can be queried on the screen to "please confirm whether there is a crack on the screen", and when the user selects "yes", it can be determined that there is a crack on the touch screen. For further example, the process of adding a crack area can be started according to a touch gesture performed by the user on the touch screen, and then it can be determined whether there is a crack on the touch screen according to the touch gesture performed by the user on the touch screen. Exemplarily, it may also be determined whether there is a crack on the touch screen according to the detection result of the mobile terminal itself. For example, it may be determined whether there is a crack on the touch screen according to the image analysis result of the photo of the brightened terminal sent by the server or other terminal.

At block 102, a crack area where the crack is located in the touch screen may be determined. Exemplarily, when it is determined that there is a crack on the touch screen, the position information of the crack area where the crack is located on the display area of the touch screen may be determined.

Exemplarily, when it is determined that there is a crack on the touch screen according to a touch gesture on the touch screen, the crack coordinate range may be determined according to the touch gesture, and the crack area of the touch screen may be determined according to the crack coordinate range. When it is determined that there is a crack on the touch screen based on an image analysis result of a photo of the lighted touch screen of the mobile terminal sent by a server or another mobile terminal, the relative position information of the crack image in the image of the touch screen can be further obtained from the analysis result, and it can be determined a cracked area of the touch screen according to the relative position information.

The touch screen used in an existing mobile terminal includes a resistive touch screen, a capacitive touch screen, and a piezoelectric touch screen. When the user touches the touch screen, the touch screen detects the touch information and then recognizes a user's touch operation. Taking a capacitive touch screen as an example, the mobile terminal records the reference capacitance value of each position when the touch screen is not touched, before the mobile terminal is shipped from the factory, when it is powered on, or other time when touch screen calibration is required. When the user touches the touch screen, the touch screen senses the change of the capacitance, if the change value (the difference between the current capacitance value and the reference capacitance value, which is usually an absolute value) exceeds the touch determination threshold, it indicates that the user touching the touch screen is detected, the touch point is reported, and the touch event is reported. When the user touches the screen, the touch information recognized by the touch screen at least includes the horizontal (x) and vertical (y) coordinates of the touch point, and may also include the size of the touch surface (including length and width, etc.) and a number of fingers that touch the touch screen etc. After the touch information is recognized, the coordinate information is reported to a upper layer by an input system, and then the touch information can be used to detect a touch operation occurring somewhere on the screen, that is, a touch position can be obtained. In order to make the crack area correspond to the touch operation, the position information in the embodiment of the present disclosure may be in one-to-one correspondence with the coordinate information in the touch information, that is, the coordinate information of the crack area and the coordinate information of the touch operation are represented by the same coordinate system. For example, the left-bottom vertex of the touch screen display area is the origin of the coordinates, the width direction is the horizontal axis, and the length direction is the vertical axis, and coordinate information is represented by numerical values of the horizontal and vertical coordinates.

At block 103, a response strategy of the crack area to a touch event of the touch screen may be adjusted. Exemplarily, the response sensitivity of the crack area to the touch operation may be increased. The crack area includes a plurality of touch points, and each touch point has a response sensitivity to a touch event of the touch screen.

In one embodiment, the response sensitivities of all of the plurality of touch points may be increased. It is beneficial to a scene in which the damaged area of the touch screen is unresponsive to touch operation. Through increasing the response sensitivities of all of the plurality of touch points, the touch operation applied by the user on the cracked area can be easily detected and the response sensitivity of the crack area to the touch event can be enhanced.

In another embodiment, when it is detected that there is at least one touch point that receives the touch signal at the frequency higher than the preset frequency value, the touch signal received by the at least one touch point may be masked. It is beneficial to a scene in which one or more points in the damaged area reported touch contact falsely, resulting in wrong operation, and affecting user's touch operation in other parts of the touch screen at the same time. Specifically, after the cracked area of the touch screen being confined, determine if there is at least one touch point that received touch signal at a frequency higher than a preset frequency value. If so, the touch signal received by the at least one touch point should be masked, to ensure a proper response to a user's touch operation in other area of the screen. Otherwise, the entire touch screen responds to the user's touch operation normally.

Further, increasing the response sensitivity of the crack area to the touch operation can be achieved in many ways and the present disclosure does not limit them, and several means are provided as schematic illustrations below.

In one embodiment, a scanning frequency of the crack area for detecting the touch event occurring on the crack area may be increased. Here, the scanning frequency may specifically be the scanning frequency of the channel corresponding to the crack area in touch chip. In general, a scan frequency of the touch chip is 10 milliseconds each time. When the scanning frequency is higher, the touch operation is more easily to be detected. When the scanning frequency is lower, the touch operation is more difficult to be detected. Exemplarily, the scan frequency may be increased to 5 milliseconds each time.

In one embodiment, a reporting frequency of the crack area for reporting the touch event occurring on the crack area may be increased. The reporting frequency may be the frequency of reporting a touch event, and may also be a frequency of reporting a touch point (also referred to as a report point rate). The touch event may include a plurality of types, such as ACTION_DOWN, ACTION_MOVE, and ACTION_UP etc., and the ACTION_DOWN event is the start event of the touch operation. In this embodiment, at least the frequency of reporting of the ACTION DOWN event may be increased. With the increase in the reporting frequency of touch operation in the crack area is increased, the probability that the upper layer receives the touch event is increased, which makes it easier to detect the touch operation.

In one embodiment, thresholds for determining the touch event of the plurality of touch points in the crack area may be reduced. As described above, for the capacitive touch screen, determining whether the touch needs to be determined according to whether the change in the capacitance value exceeds the touch determination threshold, when the touch determination threshold is lowered, the capacitance value that used not to exceed the original touch determination threshold now may be considered to exceed the lowered touch determination threshold, and therefore may be determined as a touch, making the touch operation easily detected.

In one embodiment, the reference capacitance value of the crack area may be adjusted according to the type of touch screen. The reference capacitance value may be decreased when the touch screen type is self-capacitance type, and the reference capacitance value may be increased when the touch screen type is mutual capacitance type. When the self-capacitance touch screen is touched, the capacitance value is increased, and when the mutual capacitance touch screen is touched, the capacitance value is reduced. Therefore, through the above adjustment, it is also possible to make the condition that should not be recognized as a touch easily be recognized as a touch, making the touch operation easy to detect.

It should be noted that the adjustment of the response strategy mentioned above is performed for the crack area where the crack of the touch screen is located, and the non-cracked areas outside the crack area is not affected. In addition, the above adjustment means can be arranged in any combination, that is, at least two adjustment means described above can be used at the same time. For example, the scanning frequency and the reporting frequency for the touch operation in the crack area can be increased at the same time. It can be understood that other combinations may also be used, such as using the first type and the third type at the same time, and using the first type, the second type, the third type, and so on, which will not be described in the embodiment of this disclosure.

A touch screen response control scheme provided in the embodiment of the present disclosure helps to determine whether there is a crack on the touch screen, and when it is determined that there is a crack on the touch screen, a crack area of the touch screen can be determined, and a response strategy of the crack area to the touch operation can be adjusted. By adopting the above technical solution, the touch optimization can be performed for the damaged touch screen in the mobile terminal, and the accuracy of the touch screen responding to the user operation can be improved.

In one embodiment, before determining whether there is a crack on the touch screen of the mobile terminal, a crack coordinate range may be determined according to a touch gesture on the touch screen, and storing the crack coordinate range as crack information. Alternatively, determining whether there is a crack on the mobile terminal touch screen may specifically include: determining whether there is crack information stored in the mobile terminal. When there is a crack on the touch screen, determining the crack area of the touch screen may specifically include: determining the crack area of the touch screen according to the crack coordinate range in the crack information, when there is crack information stored in the mobile terminal.

Figure 2:
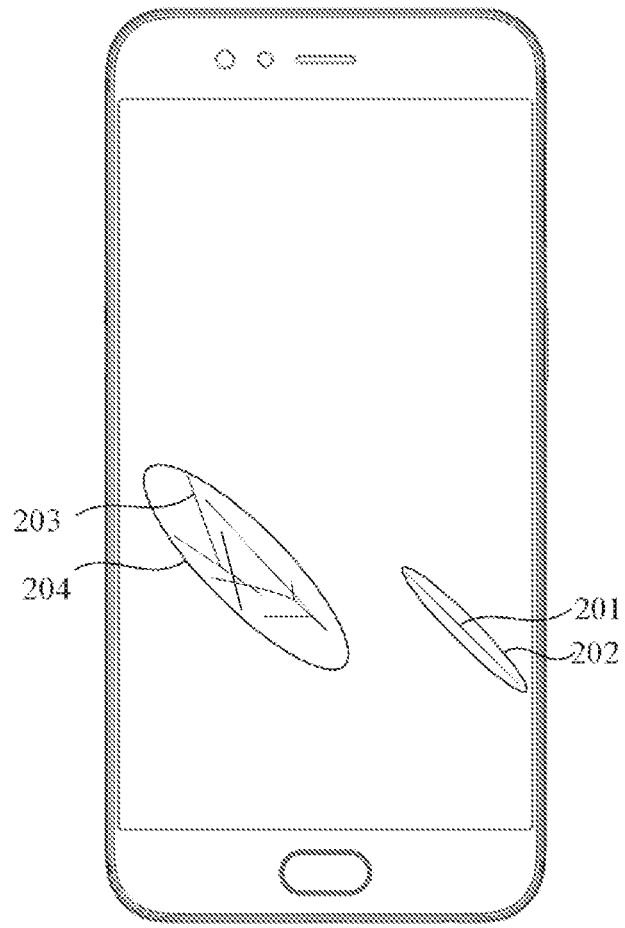
FIG. 2 is a schematic diagram illustrating a touch screen with a crack area in a mobile terminal according to one embodiment of the present disclosure.

Exemplarily, when the user observes that there is a crack on the touch screen, a touch gesture may be performed on the touch screen. The touch gesture may include tracing out a loop on the touch screen to enclose the crack, so that a closed area around the crack may be formed. Such touch gesture may be called as circle operation. The closed area formed by the circle operation may be in a shape of a regular circle, a triangle, a rectangle, or any other irregular shape. When the performing the circle operation, the user should enclose the crack in the smallest closed area. When there are multiple cracks on the touch screen and the multiple cracks have a relatively small distance between each other, only one circle operation can be performed on the touch screen to form a closed circle area so that multiple cracks are enclosed within the same closed circle selected area. When the multiple cracks have a relatively large distance between each other, multiple circle operations may be formed on the touch screen to form several closed circle selected areas, so that each closed circle selected area contains only one crack. It is also possible to make some closed circle selected areas contain only one crack, and the others contain multiple cracks. FIG. 2 is a schematic diagram illustrating a touch screen with a crack area in a mobile terminal according to one embodiment of the present disclosure. As shown in FIG. 2, both of the crack area 202 and the crack area 204 may be determined according to the circle operation of the user. The crack area 202 only includes one crack 201, and the crack area 204 includes multiple cracks 203. And for another example, when the user observes a crack on the touch screen and determines that the crack is in a regular shape, such as in a shape of a line, two circle operations may be performed on the touch screen to circle both endpoints of the line respectively. The range of the crack coordinates is determined according to the loop formed by the touch gesture on the touch screen. For example, the coordinate range where the loop formed by the touch gesture is located may be regarded as a range of the crack coordinates, and the crack coordinate range may be stored as the crack information. When it is determined that the crack information is stored in the mobile terminal, the crack area of the touch screen is determined according to the crack coordinate range in the crack information.

In one embodiment, before determining whether there is a crack on the touch screen, a photo of the brightened touch screen of the mobile terminal sent by a server or another mobile terminal may be received. Alternatively, determining whether there is a crack on the touch screen may specifically include performing image analysis on the photo, and determining whether there is a crack on the touch screen of the mobile terminal according to the analysis result. When there is a crack on the touch screen, determining the crack area of the touch screen may specifically include obtaining the relative position information of a crack image in a image of the touch screen from the analysis result when it is determined from the analysis result that there is a crack on the touch screen of the mobile terminal, and determining the crack area of the touch screen according to the relative position information Exemplarily, the another mobile terminal may also be called as a third-party mobile terminal, which may be a smart phone, a tablet computer, and any other mobile terminal with a photographing function. In the following, the description will be made with the example that the another mobile terminal is a mobile phone. The user captures a photo of the lighted screen of the mobile terminal with the mobile phone, and stores the photo of the lighted screen of the mobile terminal in the mobile phone, or uploads the photo of the lighted screen of the mobile terminal to a server. When it is necessary to determine whether there is a crack on the touch screen of the mobile terminal, the photo of the lighted screen of the mobile terminal sent by another mobile terminal or a server is received. The mobile terminal performs image analysis on the photo and determines whether there is a crack on the touch screen of the mobile terminal according to the analysis result. Exemplarily, edge detection is performed on the photo to obtain a corresponding edge image. The edge image is filtered by using the mask image to obtain a filtered edge image. The filtered edge image is refined to obtain a refined edge image and the refined image is processed with connectivity to obtain a connected edge image. The length of each edge in the connected edge image is calculated and whether there is an edge length that less than the preset edge length threshold is determined, and if so, whether there is a crack on the touch screen of the mobile terminal is determined. When it is determined that there is a crack on the touch screen of the mobile terminal according to the analysis result, the relative position information of the crack image on the touch screen image is obtained from the analysis result, and the cracked area of the touch screen is determined according to the relative position information. Exemplarily, a coordinate system is set in the photo, for example, a vertex of the lower left corner of the photo is taken as the coordinate origin, the width direction is a horizontal axis, and the length direction is a vertical axis, and the coordinate information is represented by numerical values of the horizontal and vertical coordinates. According to the determined edge, the coordinates of the determined edge area, that is, the relative position information of the crack image on the touch screen image can be calculated, so that the crack area of the touch screen can be determined according to the relative position information.

In one embodiment, after the crack area of the touch screen is determined, whether there is at least one touch point that receives a touch signal at a frequency higher than a preset frequency value may be detected. Alternatively, adjusting a response strategy of the crack area to the touch operation may specifically include masking the touch signal received by the at least one touch point when there is at least one touch point that receives touch signal at a higher frequency than a preset frequency value. Exemplarily, the preset frequency value may be a preset ratio of the scanning frequency, and the preset ratio may be higher than 80%. For example, the scanning frequency of a touch chip the touch screen is 10 milliseconds each time, and the preset ratio is 80%, then the preset frequency value is 8 milliseconds each time. When it is detected that there is at least one touch point that receives the touch signal at a higher frequency than the preset frequency value, it indicates that one or some areas in the crack area frequently misrepresent touch points and are causing wrong operations, which will also directly affects the touch operation of the user in other areas of the touch screen. Therefore, the touch signal received by the at least one touch point is masked so that the mobile terminal responds to the user's real touch operation. Exemplarily, when the mobile terminal detects that there is at least one touch point that receives the touch signal at a higher frequency than a preset frequency value, the user is prompted that the user mobile terminal will automatically mask the touch signal of the touch point, and the ask user whether to mask or not. Wherein, which may be prompted in the form of voice broadcast, or may be prompted in the form of text on the touch screen display dialog box. Further, it may also be prompted in the form of voice broadcast or the coordinate position of the touch point is prompted in a display dialog of the touch screen. When the user chooses to mask the touch signal of the touch point, a mask operation of the touch signal of the touch point is performed.

Alternatively, the strategy of adjusting the crack area in response to the touch operation may further include: when detecting there is at least one touch point that receives a touch signal at a frequency higher than a preset frequency value, masking the touch signal received by the at least one touch point, while increasing the response sensitivity of the crack area to the touch operation other than the at least one touch point. The advantage of this setting is that it can not only effectively solve the problem that one or more positions in the damaged area of the touch screen misreports the touch point frequently, resulting in wrong operations, affecting the touch operation in other area in response to the touch operation, but also can ensure the sensitivity of the crack area other than the position that misreports the touch point in response to the touch operation, the impact of the crack of the screen on the response to the touch operation is eliminated from two aspects, improving the accuracy and speed of touch screen in response to the touch operation on the whole.

In one embodiment, when a preset mask-cancelling operation is received, the masking operation of the touch signal received by the at least one touch point should be canceled. Exemplarily, according to a user's requirement, when the touch signal does not need to be masked, the masking operation of the touch signal received by the at least one touch point may be canceled according to the preset mask-cancelling operation. For example, when the mobile terminal detects that there is at least one touch point that receives a touch signal at a frequency higher than a preset frequency value, the user is prompted that the mobile terminal will automatically mask the touch signal of the touch point, and the user is requested to determine whether to mask or not. When the user choose to mask the touch signal of the touch point, not only the masking operation of the touch signal of the touched point is performed, but also the user can be prompted to cancel the masking operation of the touch signal received by the at least one touched point through a preset masking operation, namely how to cancel the masking operation. Exemplarily, when the user indeed wants to touch the touch point, the user can cancel the masking operation of the touch point by pressing a volume key. Wherein, when the mobile terminal is a smart phone, the preset masking operation may be the volume key; it may also be a long press of a home key within a preset time; it may be a combination operation of the volume key and the home key, for example, simultaneously press the volume key and the home key to cancel the masking operation of the at least one touch point. Alternatively, the masking operation of the touch signal received by the at least one touch point may also be canceled according to the motion state of the mobile terminal. Exemplarily, when it is detected that the mobile terminal shakes left and right or shakes up and down, and the number of shaking times reaches a preset threshold, the masking operation of the touch signal received by the at least one touch point is canceled.

Figure 3:
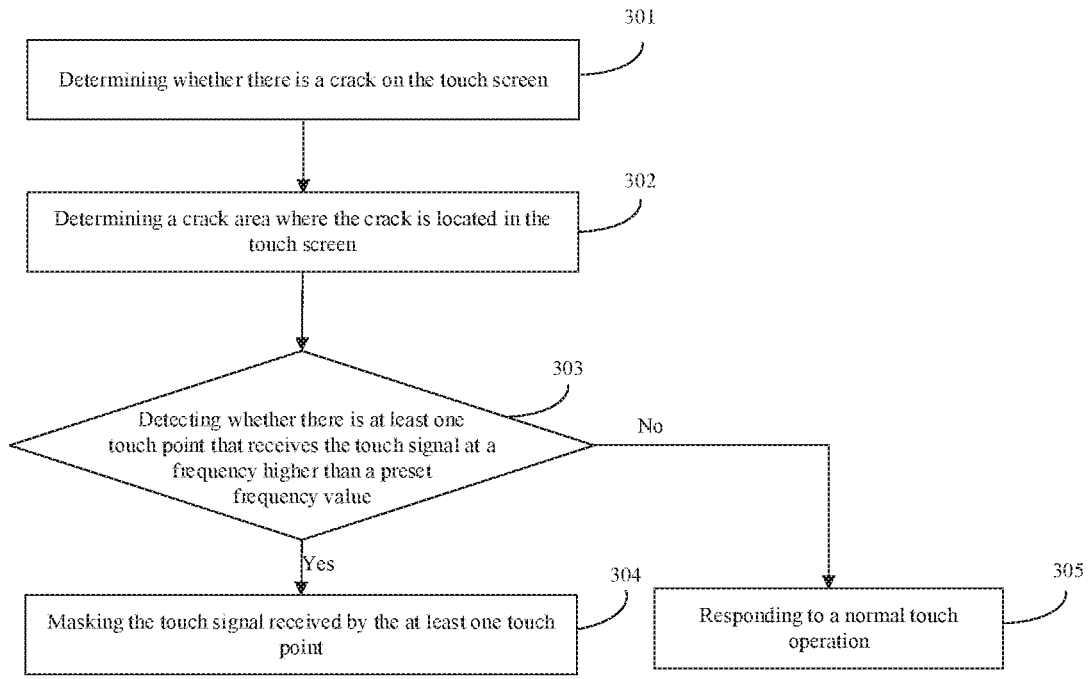
FIG. 3 is a flow diagram illustrating a method for response control of a touch screen according to another embodiment of the present disclosure.

FIG. 3 is a flow diagram illustrating a method for response control of a touch screen according to one embodiment of the present disclosure. As illustrated in FIG. 3, whether there is a crack on the touch screen may be determined at block 301. A crack area of the touch screen may be determined when there is a crack on the touch screen at block 302. Whether there is at least one touch point that receives the touch signal at a frequency higher than a preset frequency value may be detected at block 303. If there is at least one touch point that receives the touch signal at a frequency higher than a preset frequency value, proceed to block 304, otherwise proceed to block 305. The touch signal received by the at least one touch point may be masked at block 304. A normal touch operation may be responded at block 305.

In this embodiment, when it is determined that there is a crack on the touch screen, a crack area of the touch screen is determined, and when there is at least one touch point on the crack area that receives the touch signal at the frequency higher than the preset frequency value, the touch signal received by the at least one touch point is masked. In this way, it can not only effectively solve the problem that one or more positions in the damaged area of the touch screen misreports the touch point frequently, resulting in wrong operations, but also can eliminate the impact on the other area in response to the touch operation due to the touch point that misreports in the damaged area of the touch screen, and improve the response accuracy of the touch screen to the user operation.

Figure 4:
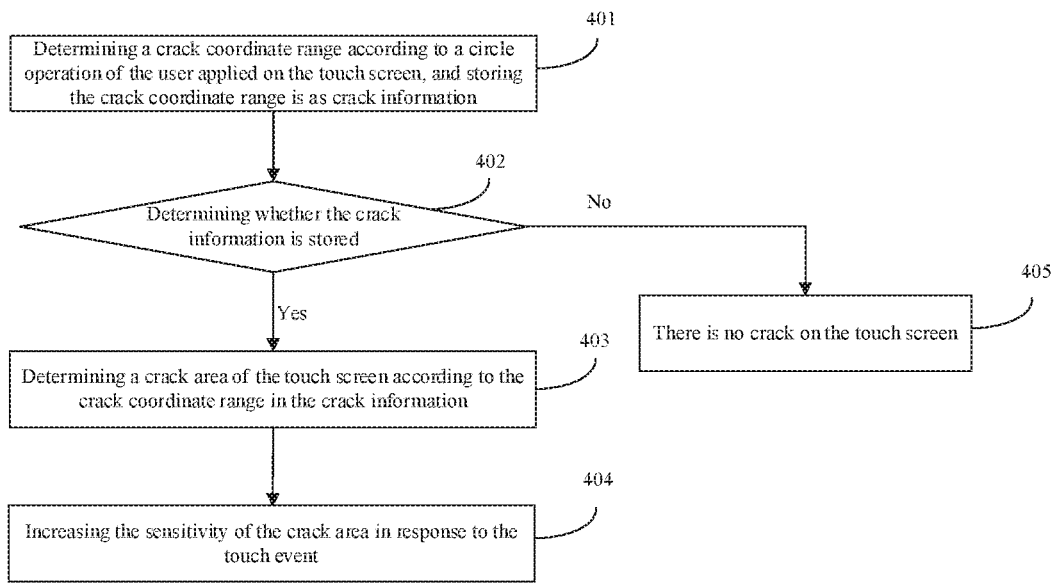
FIG. 4 is a flow diagram illustrating a method for response control of a touch screen according to a further embodiment of the present disclosure.

FIG. 4 is a flow diagram illustrating a method for response control of a touch screen according to one embodiment of the present disclosure. As illustrated in FIG. 4, a crack coordinate range may be determined according to a circle operation of the user applied on the touch screen, and the crack coordinate range may be stored in the mobile terminal as crack information at block 401. Whether there is crack information stored in the mobile terminal may be determined at block 402. If there is crack information stored in the mobile terminal, proceed to 403, otherwise proceed to block 405. A crack area of the touch screen may be determined according to the crack coordinate range in the crack information at block 403. The response sensitivity of the crack area to the touch event may be increased at block 404. Exemplarily, in this embodiment, any one or more of means for improving the response sensitivity of the crack area to the touch event may be applied, which is not specifically limited. At block 405, there may be no crack on the touch screen.

The method for response control of a touch screen provided in this embodiment can accurately determine the crack area of the touch screen according to the user's circle operation on the touch screen, and can improve the response sensitivity of the crack area to the touch operation, and further improve the accuracy of the touch screen in response to the user operation.

Figure 5:
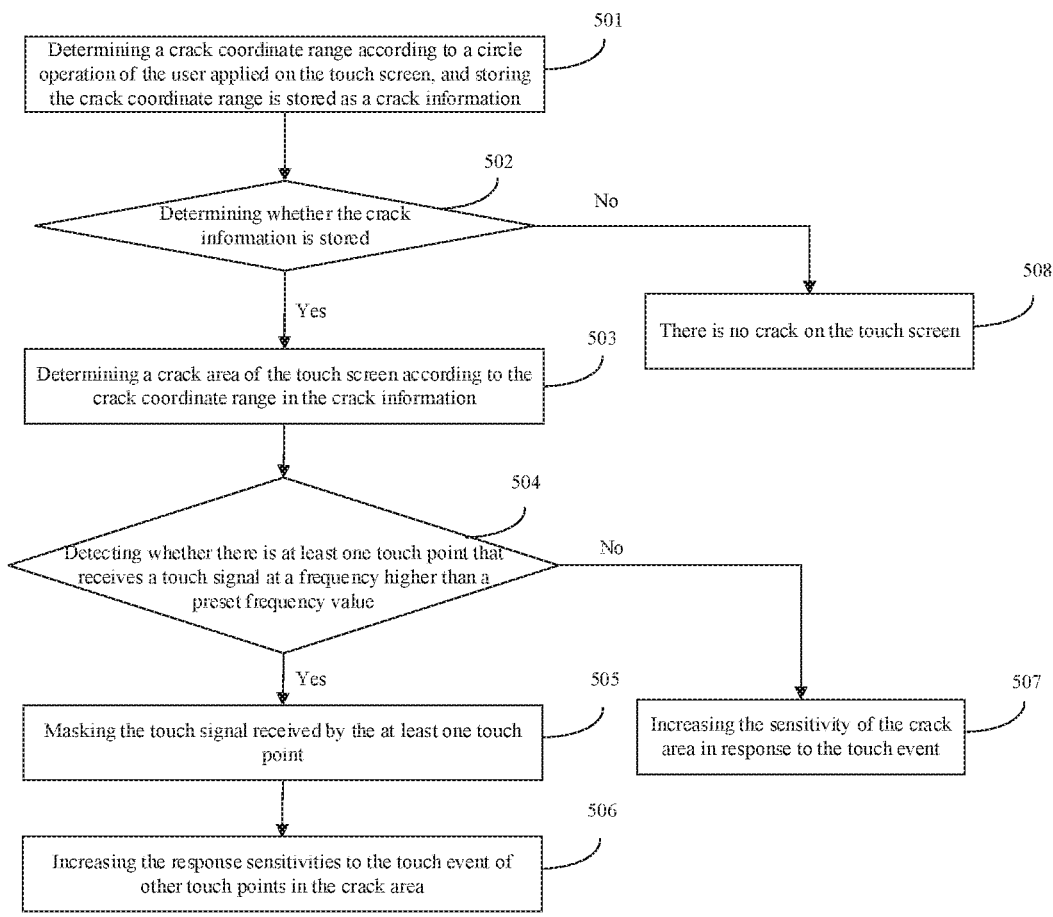
FIG. 5 is a flow diagram illustrating a method for response control of a touch screen according to a further embodiment of the present disclosure.

FIG. 5 is a flow diagram illustrating a method for response control of a touch screen according to one embodiment of the present disclosure. As illustrated in FIG. 5, a crack coordinate range according to a circle operation of the user applied on the touch screen may be determined, and the crack coordinate range as crack information may be stored at block 501. Whether there is crack information stored in the mobile terminal may be determined at block 502. If there is crack information stored in the mobile terminal, proceed to block 503, otherwise proceed to block 508. A crack area of the touch screen may be determined according to the crack coordinate range in the crack information at block 503. Whether there is at least one touch point that receives a touch signal at a frequency higher than a preset frequency value may be determined at block 504. If there is at least one touch point that receives a touch signal at a frequency higher than a preset frequency value, proceed to step block 505, otherwise proceed to step block 507. The touch signal received by the at least one touch point may be masked at block 505. The response sensitivities to the touch event of other touch points in the crack area may be increased at block 506. The response sensitivity of the crack area to the touch event may be increased at block 507. There may be no crack on the touch screen at block 508.

In this embodiment, when there is at least one touch point that receives the touch signal at the frequency higher than the preset frequency value in the crack area, the touch signal received by the at least one touch point is masked, and the response sensitivities of other touch points in the crack area is increased. In this way, it can not only effectively solve the problem that one or more positions in the damaged area of the touch screen misreports the touch point frequently, resulting in wrong operations, affecting the touch operation in other area in response to the touch operation, but also can ensure the sensitivity of the crack area other than the position that misreports the touch point in response to the touch operation, the impact of the crack of the screen on the response to the touch operation is eliminated from two aspects, improving the response accuracy and response speed of touch screen to the touch operation.

Figure 6:
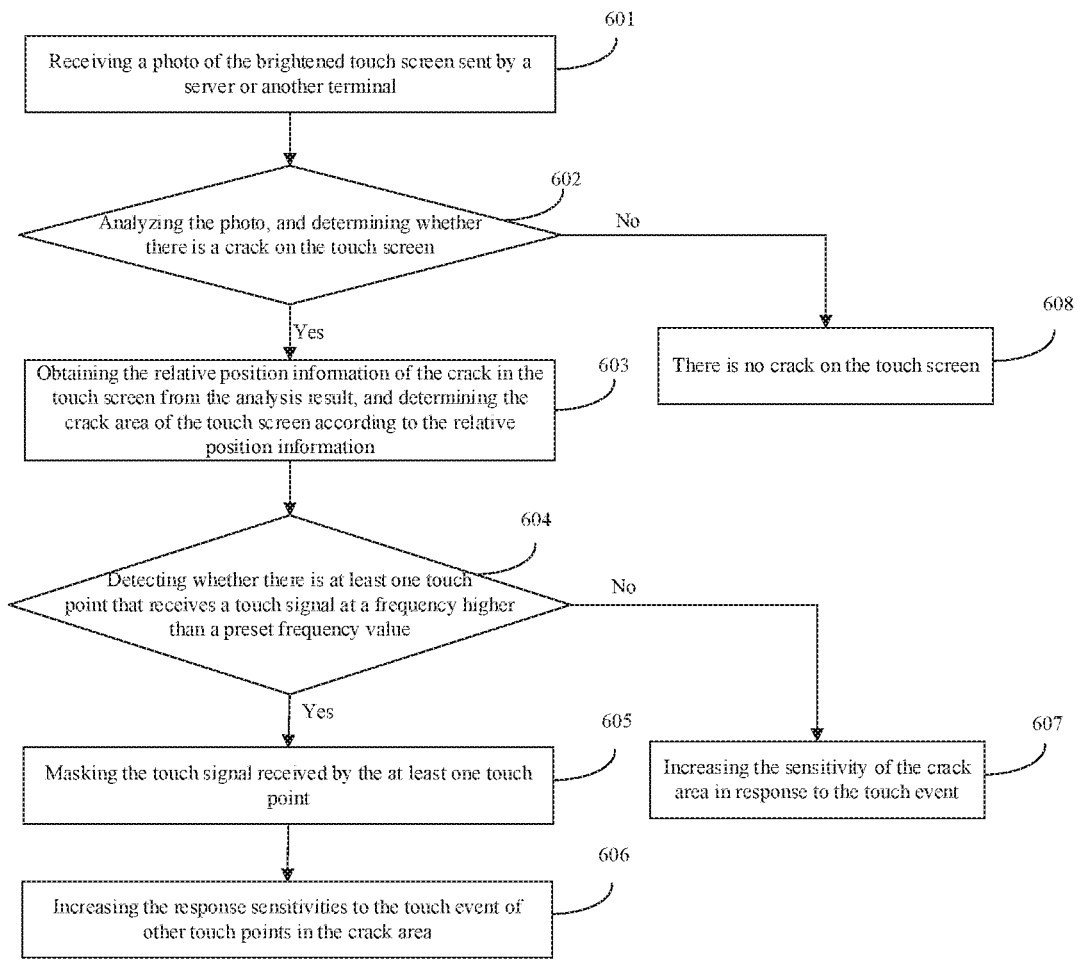
FIG. 6 is a flow diagram illustrating a method for response control of a touch screen according to a further embodiment of the present disclosure.

FIG. 6 is a flow diagram illustrating a method for response control of a touch screen according to one embodiment of the present disclosure. As illustrated in FIG. 6, a photo of the brightened touch screen sent by a server or other terminal may be received at block 601. The photo may be analyzed to determine whether there is a crack on the touch screen at block 602. If there is a crack on the touch screen, proceed to block 603, otherwise proceed to block 608. The relative position information of the crack in the touch screen may be obtained, and the crack area of the touch screen may be determined according to the relative position information at block 603. Whether there is at least one touch point that receives a touch signal at a frequency higher than a preset frequency value may be detected at block 604. If there is at least one touch point that receives a touch signal at a frequency higher than a preset frequency value proceed to block 605, otherwise proceed to block 607. The touch signal received by the at least one touch point may be masked at block 605. The response sensitivities to the touch event of other touch points in the crack area may be increased at block 606. The response sensitivity of the crack area to the touch event may be increased at block 607. There may be no crack on the touch screen at block 608.

In this embodiment, whether there is a crack on the touch screen can be accurately determined by accurately analyzing the image of the photo of the brightened touch screen, and the further touch optimization can be performed for the damaged touch screen by accurately locating the position of the crack area.

Figure 7:
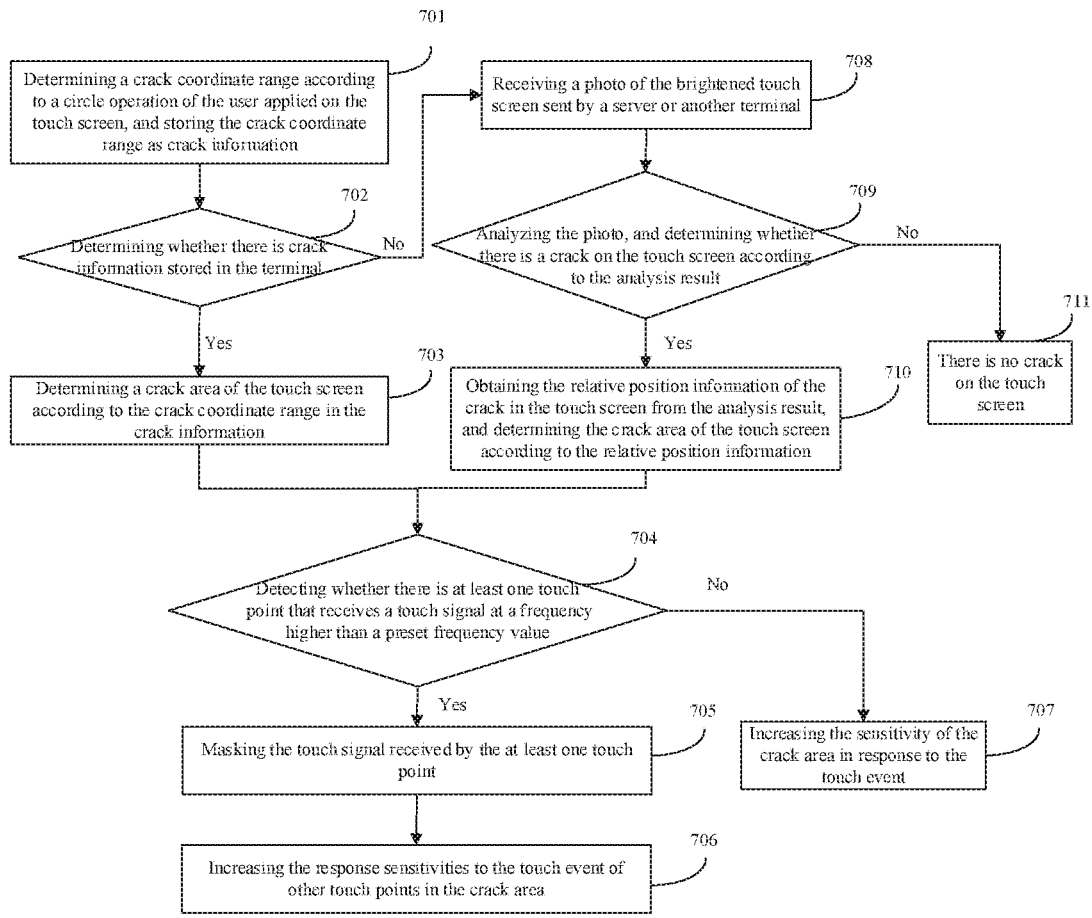
FIG. 7 is a flow diagram illustrating a method for response control of a touch screen according to a further embodiment of the present disclosure.

FIG. 7 is a flow diagram illustrating a method for response control of a touch screen according to one embodiment of the present disclosure. As illustrated in FIG. 7, a crack coordinate range may be determined according to a circle operation of the user applied on the touch screen, and the crack coordinate range may be stored as crack information in the mobile terminal at block 701. Whether there is crack information stored in the mobile terminal may be determined at block 702. If there is crack information stored in the mobile terminal, proceed to block 703, otherwise proceed to block 708. A crack area of the touch screen may be determined according to the crack coordinate range in the crack information at block 703. Whether there is at least one touch point that receives a touch signal at a frequency higher than a preset frequency value may be determined at block 704. If there is at least one touch point that receives a touch signal at a frequency higher than a preset frequency value, proceed to block 705, otherwise proceed to block 707. The touch signal received by the at least one touch point may be masked at block 705. The response sensitivities to the touch event of other touch points in the crack area may be increased at block 706. The response sensitivity of the crack area to the touch event may be increased at block 707. A photo of the brightened touch screen sent by a server or another terminal may be received at block 708. The photo may be analyzed to determine whether there is a crack on the touch screen according to the analysis result. If there is a crack on the touch screen, proceed to block 710, otherwise proceed to block 711. The relative position information of the crack in the touch screen may be obtained, and the crack area of the touch screen may be determined according to the relative position information at block 710. There may be no crack on the touch screen at block 711.

In this embodiment, whether there is a crack on the touch screen may be accurately analyzed and determined by the circle operation of the user applied on the touch screen in combination with the image analysis on the photo of the brightened touch screen, to improve the location accuracy of the crack area. In this way, the response control of the damaged touch screen can be further optimized.

Figure 8:
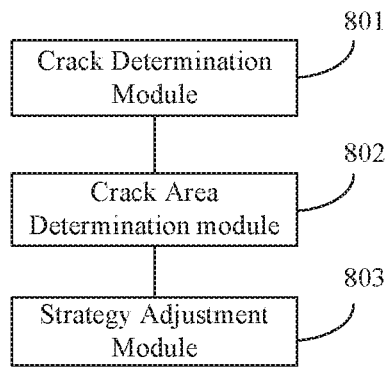
FIG. 8 is a structural block diagram of a device for response control of a touch screen according to one embodiment of the present disclosure.

FIG. 8 is a structural block diagram of a device for response control of a touch screen according to one embodiment of the present disclosure. The device may be implemented by software and/or hardware and integrated into a mobile terminal. As shown in FIG. 8, the device includes a crack determination module 801, a crack area determination module 802 and a strategy adjustment module 803. The crack determination module 801 is configured to determine whether there is a crack on the touch screen. The crack area determination module 802 is configured to determine where the crack is located in the touch screen. The strategy adjustment module 803 is configured to adjust a response strategy of the crack area to a touch event of the touch screen.

In this embodiment, the device can determine whether there is a crack on the touch screen. When it is determined that there is a crack on the touch screen, a crack area of the touch screen is determined, and a response strategy of the crack area to the touch event is adjusted. In this way, the touch optimization can be performed for the damaged touch screen, to improve the response accuracy of the touch screen to the user operation.

In one embodiment, the device may further include a crack area detection module. The crack area detection module is configured to detect whether there is at least one touch point that receives a touch signal at a frequency higher than a preset frequency value after the crack area of the touch screen is determined. The strategy adjustment module may be further configured to mask the touch signal received by at least one touch point, when there is at least one touch point that receives the touch signal at the frequency higher than the preset frequency value.

In one embodiment, the device may further include a mask operation cancellation module. The mask operation cancellation module is configured to cancel the mask operation of the touch signal received by the at least one touch point when the preset mask-cancelling operation is received.

In one embodiment, the strategy adjustment module may include a sensitivity increasing unit configured to increase the response sensitivity of the crack area to the touch event.

In one embodiment, the sensitivity increasing unit may be further configured to: increase a scanning frequency of the crack area for detecting the touch event occurring on the crack area, increase a reporting frequency of the crack area for reporting the touch event occurring on the crack area; reduce thresholds for determining the touch event of the plurality of touch points in the crack area; and adjust the reference capacitance value corresponding to the crack area according to a touch screen type, wherein the reference capacitance value is decreased when the touch screen type is a self-capacitance type, and the reference capacitance value is increased when the touch screen type is a mutual capacitance type.

In one embodiment, the device may further include a crack coordinate range determination module configured to determine a crack coordinate range according to a circle operation of the user applied on the touch screen, and to store the crack coordinate range as crack information, before determining whether there is a crack on a touch screen. The crack determination module is further configured to determine whether there is crack information stored in the mobile terminal. The crack area determining module is further configured to determine a crack area of the touch screen according to the crack coordinate range in the crack information.

In one embodiment, the device may further include a photo receiving module configured to receive a photo of the brighten touch screen of the mobile terminal sent by a server or another terminal before determining whether there is a crack on the touch screen. The crack determination module may be further configured to perform an image analysis on the photo, and determine whether there is a crack on the touch screen according to the analysis result. The crack area determining module may be further configured to obtain the relative position information of the crack in the touch screen from the analysis result, and determine the crack area of the touch screen according to the relative position information.

Figure 9:
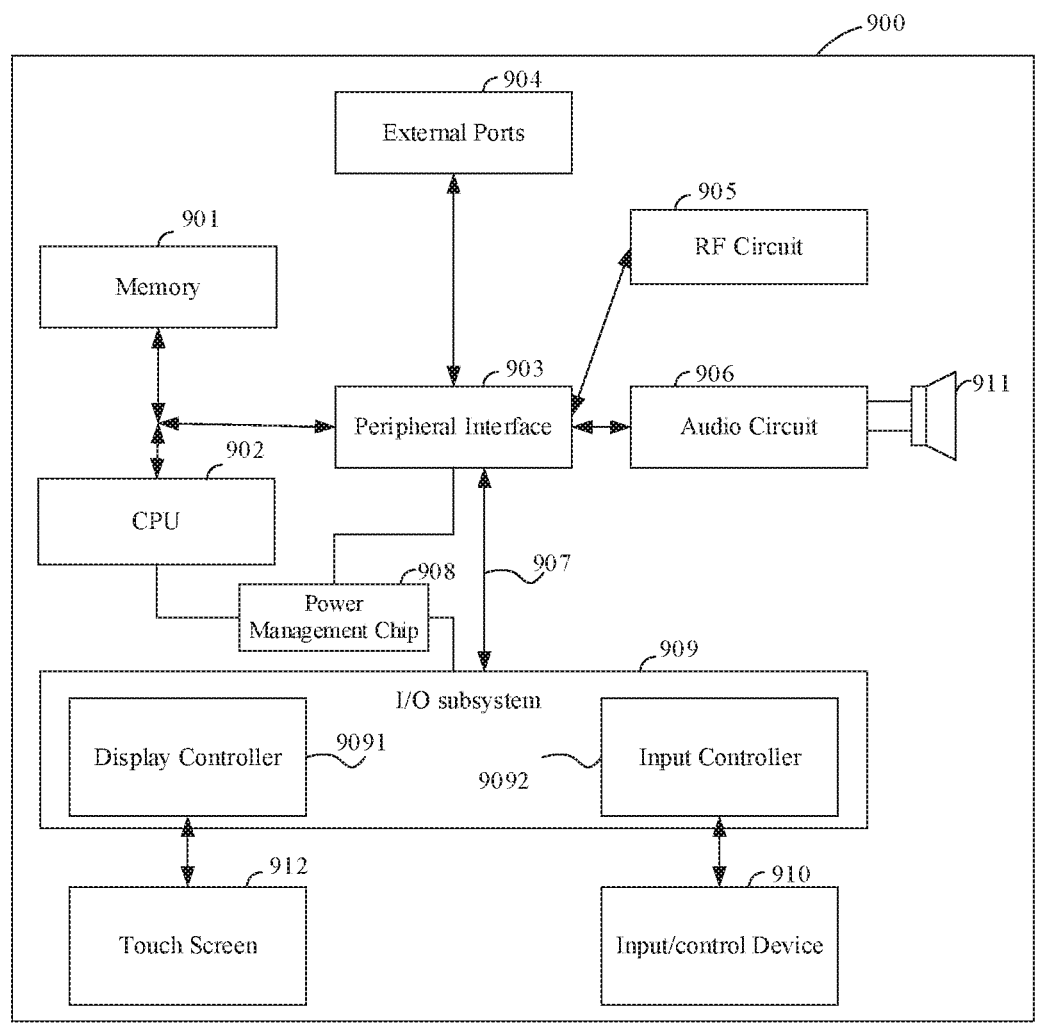
FIG. 9 is a structural schematic diagram illustrating a mobile terminal according to one embodiment of the present disclosure.

A mobile terminal is provided. The above device for response control of a touch screen may be integrated in to the mobile terminal. FIG. 9 is a schematic structural diagram illustrating a mobile terminal according to one embodiment of the present disclosure. As shown in FIG. 9, the terminal may include: a housing (not shown), a memory 901, a central processing unit (CPU) 902 (also referred to as a processor, hereinafter simply referred to as a CPU), and a circuit board (not shown) and power circuit (not shown). The circuit board is disposed inside a space enclosed by the housing. The CPU 902 and the memory 901 are disposed on the circuit board. The power supply circuit is configured to supply power to each circuit or component of the mobile terminal. The memory 901 is configured to store executable program code. The CPU 902 may read the executable program code stored in the first memory 901 and execute the program corresponding to the executable program code, so that the CPU 902 is caused to: determine whether there is a crack on the touch screen; determine a crack area where the crack is located in the touch screen, the crack area comprising a plurality of touch points, each touch point having a response sensitivity to a touch event of the touch screen; and adjust a response strategy of the crack area to the touch event of the touch screen.

The mobile terminal further includes: a peripheral interface 903, a RF (Radio Frequency) circuit 905, an audio circuit 906, a speaker 911, a power management chip 908, an input/output (I/O) subsystem 909, a touch screen 912, and other input/control devices 910 and external ports 904. These components are communicated via one or more communication buses or signal lines 907.

It should be understood that the illustrated mobile terminal 900 is only an example of the mobile terminal, and that the mobile terminal 900 may include more or fewer components than those illustrated in the drawing. It is possible to combine two or more components, or have a different arrangement of the components. The various components illustrated in the drawings may be implemented by including one or more signal processing and/or application specific integrated circuits, software or the combination of the hardware and software.

The mobile terminal, taking a mobile phone as an example of the same, provided in this embodiment and configured to implement response control of a touch screen will be herein described in detail.

The memory 901 may be accessed by the CPU 902 and the peripheral interface 903. The memory 901 may include a high speed random access memory, and may also include a non-volatile memory, for example, at least one magnetic disk memory, flash memory or any other transitory solid-state memory.

The peripheral interface 903 may be configured to couple the input and output peripherals of the device to CPU 902 and memory 901.

The I/O subsystem 909 may be configured to couple an input and output peripheral on the device, such as the touch screen 912 and other input/control devices 910, to the peripheral interface 903. The I/O subsystem 909 may include a display controller 9091, and one or more input controllers 9092 configured to control the other input/control devices 910. The one or more input controllers 9092 may receive electrical signals from the other input/control devices 910 or transmit electrical signals to the other input/control devices 910. The other input/control devices 910 may include a physical button (such as press button, and rocker buttons), a dial, a sliding switch, a joystick and a scroll wheel. It should be noted that the input controller 9092 may be coupled to any one of a keyboard, an infrared port, a USB port and an indicating device such like a mouse.

The touch screen 912 may be an input and output interface between the user terminal and the user and display the visible output to the user. The visual output may include a graphic, a text, an icon, a video and the like.

The display controller 9091 in the I/O subsystem 909 may receive an electrical signal from the touch screen 912 or transmit an electrical signal to touch screen 912. The touch screen 912 may detect a touch on the touch screen. The display controller 9091 may convert the detected touch into an interaction with the user interface object displayed on the touch screen 912, i.e. realizing the human-computer interaction. The user interface object displayed on the touch screen 912 may be an icon for launching a game or an icon for connecting to a corresponding network. It should be noted that the device may further include an optical mouse, which is a touch sensitive surface that does not display visual output or is an extension of the touch sensitive surface formed by the touch screen.

The RF circuit 905 is mainly configured to establish communication between a mobile phone and a wireless network (i.e., a network side), so as to implement the data receiving and transmitting between the mobile phone and the wireless network. For example, receiving and transmitting a text message, an emails or the like. Specifically, the RF circuit 905 receives and transmits an RF signal, which is also referred to as an electromagnetic signal. The RF circuit 905 converts the electrical signal into an electromagnetic signal or converts the electromagnetic signal into an electrical signal, and communicates with the communication network and other devices through the electromagnetic signal. RF circuitry 905 may include known circuitry for performing these functions, including but not limited to antenna systems, RF transceivers, one or more amplifiers, tuners, one or more oscillators, digital signal processors, CODECs (COder-DECoder, codec) chipset, Subscriber Identity Module (SIM), and so on.

The audio circuit 906 is mainly configured to receive audio data from the peripheral interface 903, convert the audio data into an electrical signal, and transmit the electrical signal to the speaker 911.

The speaker 911 is configured to restore an audio signal received from the wireless network by the smart speaker through the RF circuit 905 into a sound and play the sound to the user.

The power management chip 908 is configured to supply power to the CPU 902, the I/O subsystem, and the hardware connected to the peripheral interface, and perform power management.

A storage medium for storing computer executable instructions is also provided, the computer executable instructions being used to control a processor to execute a method for response control of a touch screen, the method including: determining whether there is a crack on the touch screen; determining a crack area where the crack is located in the touch screen, the crack area comprising a plurality of touch points, each touch point having a response sensitivity to a touch event of the touch screen; and adjusting a response strategy of the crack area to the touch event of the touch screen.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, electric wire, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a. wide area network (WAN), or the connection may be made to an external computer (for example, through the Internet using an Internet Service Provider).

It should be noted that, the above descriptions are merely the preferred embodiments and applied technical principles of the present disclosure. A person skilled in the art should understand that the present disclosure is not limited to the specific embodiments herein, and for a person skilled in the art, various obvious variations, readjustments and replacements may be made without departing from the protection scope of the present disclosure. Therefore, although the present disclosure is described in detail through the above embodiments, the present disclosure is not merely limited to the above embodiments. More other equivalent embodiments may further be included without departing from the conception of the present disclosure. The scope of the present disclosure is defined by the appended claims.

What is claimed is:

1. A method for response control of a touch screen, comprising:
   determining whether there is a crack on the touch screen;
   determining a crack area where the crack is located in the touch screen, the crack area comprising a plurality of touch points, each touch point having a response sensitivity to a touch event of the touch screen; and
   when there is at least one touch point of the plurality of touch points in the crack area that receives a touch signal at a frequency higher than a preset frequency value, masking the touch signal received by the at least one touch point and increasing response sensitivities to the touch event of other touch points of the plurality of touch points in the crack area.

2. The method of claim 1, further comprising:
   detecting whether there is at least one touch point of the plurality of touch points that receives the touch signal at the frequency higher than the preset frequency value.

3. The method of claim 1, further comprising:
   canceling the masking of the touch signal received by the at least one touch point, upon receiving a mask-cancelling operation.

4. The method of claim 1, further comprising:
   determining a crack coordinate range based on a touch gesture on the touch screen; and
   determining the crack area based on the crack coordinate range.

5. The method of claim 4, wherein the touch gesture comprises: tracing out a loop on the touch screen to enclose the crack.

6. The method of claim 1, further comprising:
   taking a photo of the touch screen when the touch screen is brightened;
   analyzing the photo of the touch screen to detect the crack;
   obtaining a position of the crack in the touch screen based on the analyzed photo; and
   determining the crack area based on the position of the crack.

7. A mobile terminal for response control of a touch screen, comprising:
   a processor;
   a touch screen; and
   a memory including instructions operable to be executed by the processor to cause the processor to:
   determine whether there is a crack on the touch screen;
   determine a crack area where the crack is located in the touch screen, the crack area comprising a plurality of touch points, each touch point having a response sensitivity to a touch event of the touch screen; and
   when there is at least one touch point of the plurality of touch points in the crack area that receives a touch signal at a frequency higher than a preset frequency value, mask the touch signal received by the at least one touch point and increase response sensitivities to the touch event of other touch points of the plurality of touch points in the crack area.

8. The mobile terminal of claim 7, wherein the instructions when executed further cause the processor to:
   detect whether there is at least one touch point of the plurality of touch points that receives the touch signal at the frequency higher than the preset frequency value.

9. The mobile terminal of claim 7, wherein the instructions when executed further cause the processor to:
   determine a crack coordinate range based on a touch gesture on the touch screen; and
   determine the crack area based on the crack coordinate range.

10. The mobile terminal of claim 7, wherein the instructions when executed further cause the processor to:
    take a photo of the touch screen when the touch screen is brightened;
    analyze the photo of the touch screen to detect the crack;
    obtain a position of the crack in the touch screen based on the analyzed photo; and
    determine the crack area based on the position of the crack.

11. A non-transitory computer-readable storage medium for storing computer executable instructions, the computer executable instructions being used to control a processor to execute a method for response control of a touch screen, the method comprising:
    determining whether there is a crack on the touch screen;
    determining a crack area where the crack is located in the touch screen, the crack area comprising a plurality of touch points, each touch point has a response sensitivity to a touch event of the touch screen; and
    when there is at least one touch point of the plurality of touch points in the crack area that receives a touch signal at a frequency higher than a preset frequency value, masking the touch signal received by the at least one touch point and increasing response sensitivities to the touch event of other touch points of the plurality of touch points in the crack area.

\* \* \* \* \*